No. 652,571. Patented June 26, 1900.
O. WAECHTERSHAEUSER.
MOTOR VEHICLE.
(Application filed Aug. 16, 1899.)

(No Model.) 5 Sheets—Sheet 1.

No. 652,571. Patented June 26, 1900.
O. WAECHTERSHAEUSER.
MOTOR VEHICLE.
(Application filed Aug. 16, 1899.)
(No Model.) 5 Sheets—Sheet 2.

WITNESSES:
INVENTOR
BY
ATTORNEY

No. 652,571. Patented June 26, 1900.
O. WAECHTERSHAEUSER.
MOTOR VEHICLE.
(Application filed Aug. 16, 1899.)

(No Model.) 5 Sheets—Sheet 3.

WITNESSES:
Gustave Dietrich
John Kehlenbeck

INVENTOR
Otto Waechtershaeuser
BY
Chas. G. Wahle
ATTORNEY

No. 652,571. Patented June 26, 1900.
O. WAECHTERSHAEUSER.
MOTOR VEHICLE.
(Application filed Aug. 16, 1899.)
(No Model.) 5 Sheets—Sheet 4.

WITNESSES:

INVENTOR
Otto Waechtershaeuser
BY
Chas. G. F. Wahle
ATTORNEY

No. 652,571. Patented June 26, 1900.
O. WAECHTERSHAEUSER.
MOTOR VEHICLE.
(Application filed Aug. 16, 1899.)
(No Model.) 5 Sheets—Sheet 5.
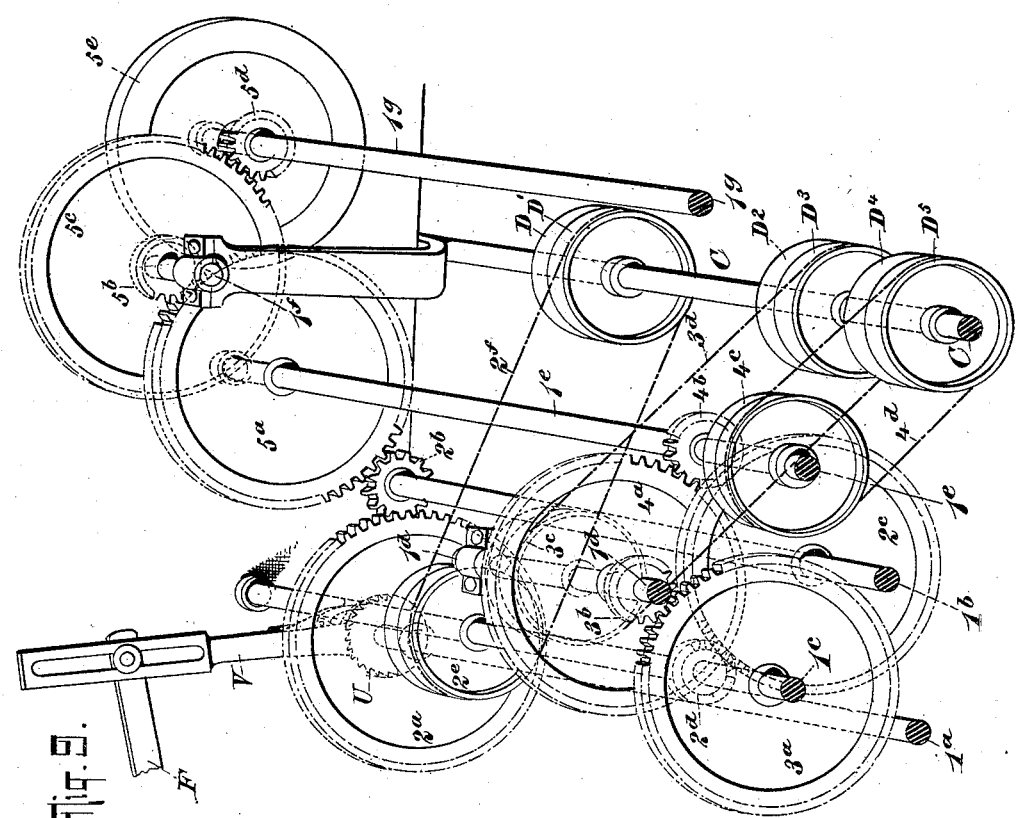
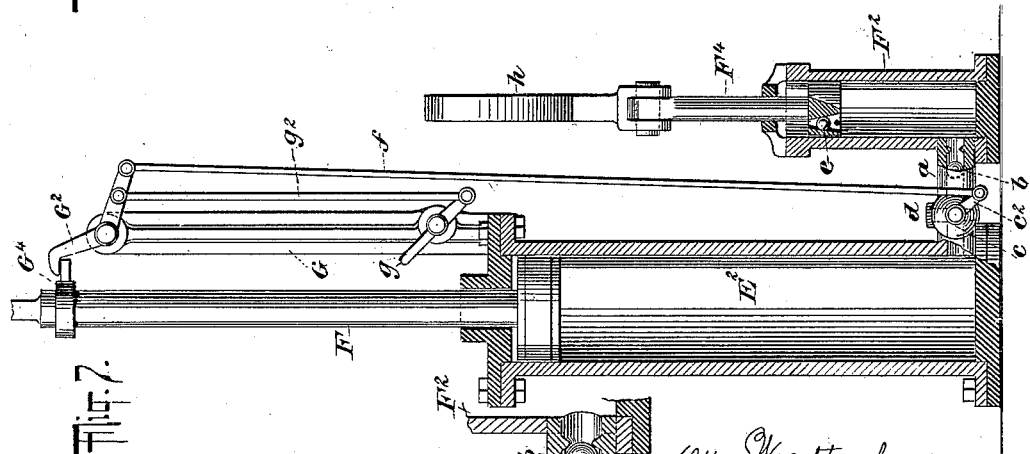
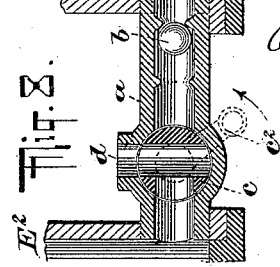
WITNESSES:
INVENTOR
BY
ATTORNEY

UNITED STATES PATENT OFFICE.

OTTO WAECHTERSHAEUSER, OF ELIZABETH, NEW JERSEY.

MOTOR-VEHICLE.

SPECIFICATION forming part of Letters Patent No. 652,571, dated June 26, 1900.

Application filed August 16, 1899. Serial No. 727,466. (No model.)

*To all whom it may concern:*

Be it known that I, OTTO WAECHTERSHAEUSER, a citizen of the United States, residing at 10 South Fifth street, Elizabeth, Union county, New Jersey, have invented certain new and useful Improvements in Motor-Vehicles, of which the following is a full, clear, and exact specification.

My invention relates to means for operating vehicles, and has for its object more particularly to provide a simple, efficient, and economical motor for the purposes above named.

The object above set forth I am enabled to attain by means of my invention, which consists in the novel details of construction and in the combination, connection, and arrangement of parts hereinafter more fully set forth and then pointed out in the claims.

Figure 1:
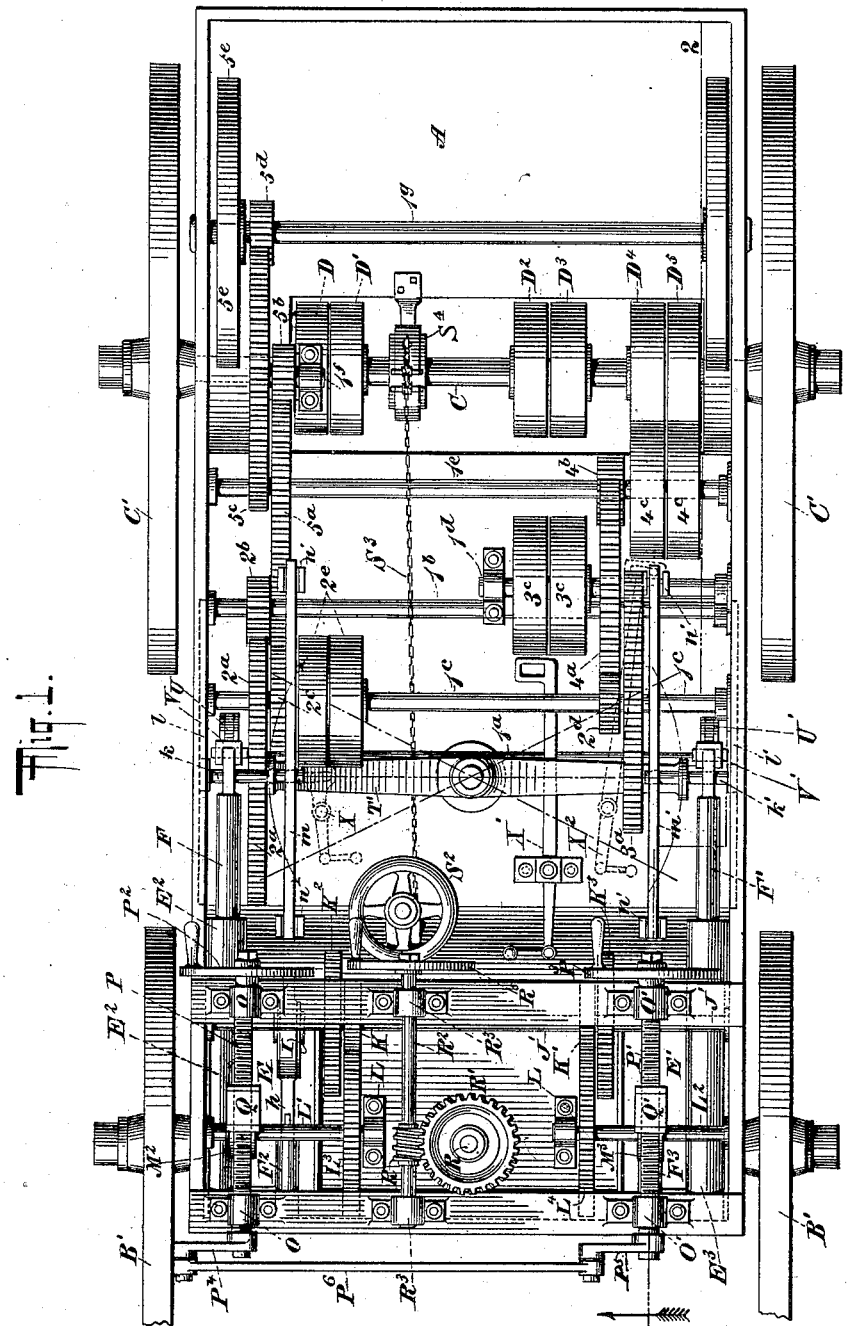
Figure 2:
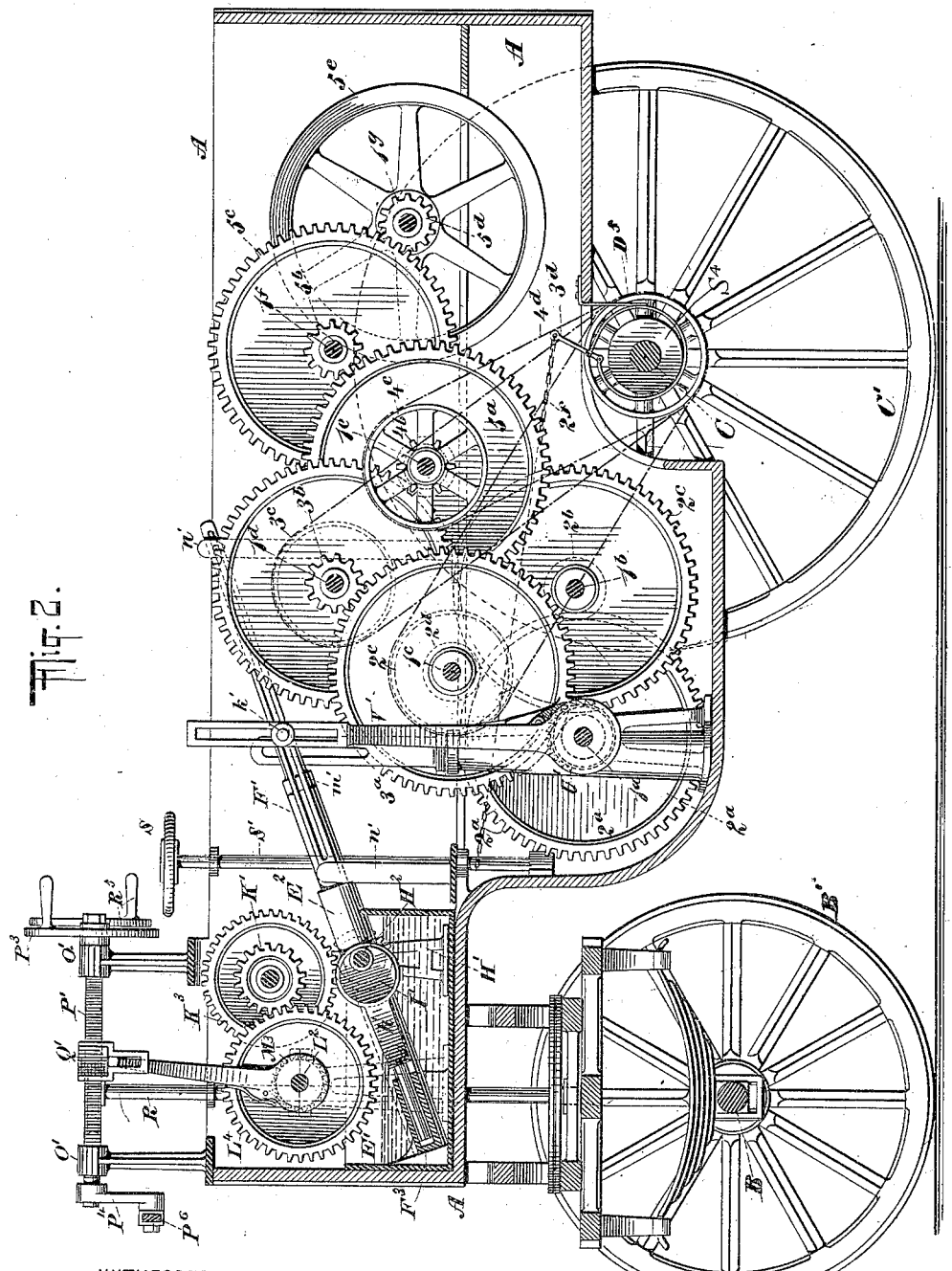
Figure 3:
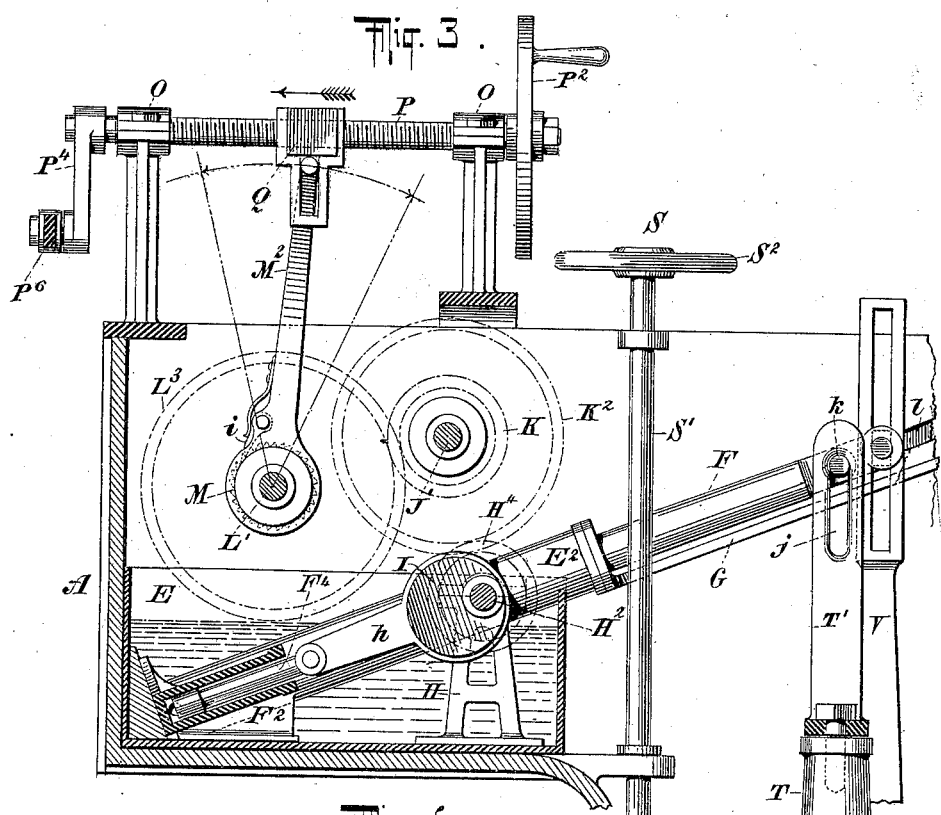
Figure 4:
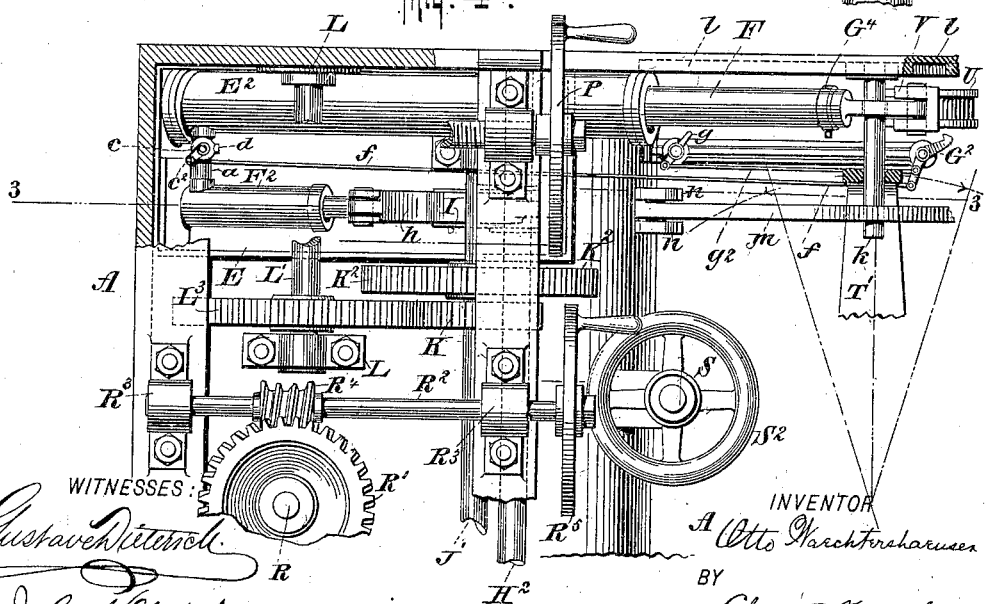
Figure 5:
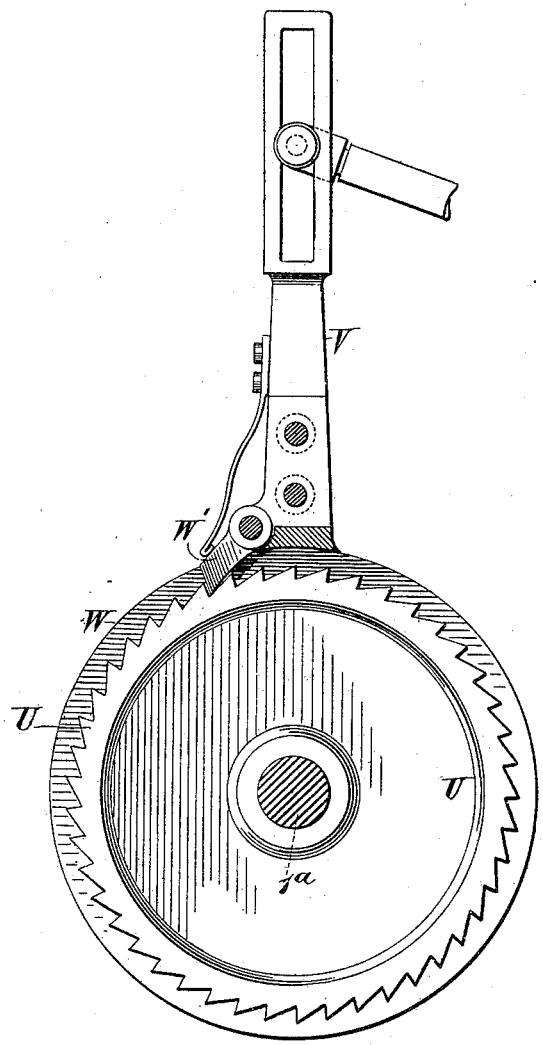
Figure 6:
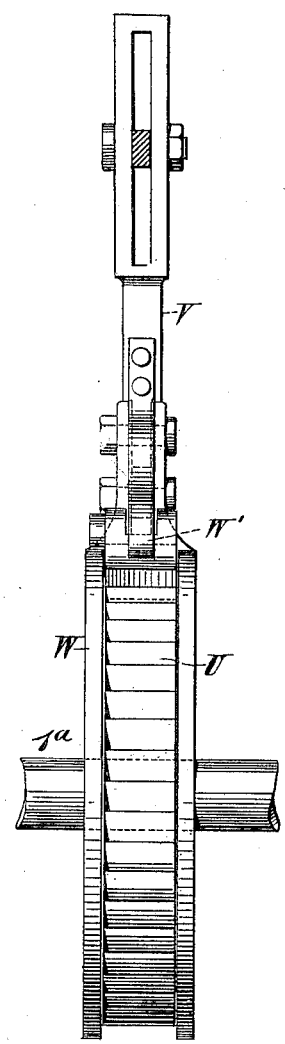

In the accompanying drawings, wherein like characters of reference indicate like parts, Figure 1 is a plan view of a vehicle-body, showing my motor applied thereto. Fig. 2 is a section taken on the line 2 2 of Fig. 1. Fig. 3 is an enlarged detail section taken on the line 3 3 of Fig. 4, showing one set of cylinders and the means for operating the same. Fig. 4 is an enlarged detail plan view of the portion of the apparatus shown in section at Fig. 3. Fig. 5 is an enlarged side view, partly in section, of one of the ratchets and lever attached thereto. Fig. 6 is a side view thereof. Fig. 7 is an enlarged detail section showing one set of cylinders, the valve mechanism, and means for operating the same. Fig. 8 is an enlarged detail section showing the connection between said cylinders and the valve mechanism arranged therein, and Fig. 9 is a diagrammatic perspective view showing the various trains of gearing for operating the vehicle.

In said drawings, A designates a vehicle-body which is supported upon the forward axle B and steering-wheels B' B' and rear axle C and driving-wheels C' C', and D D' $D^2$ $D^3$ $D^4$ $D^5$ denote, respectively, loose and fixed pulleys arranged upon said rear axle C.

In the front part of the vehicle-body A are provided receptacles E E', adapted to receive any suitable operating fluid—such, for example, as water, alcohol, oil, or glycerin—and disposed within these receptacles are cylinders $E^2$ $E^3$, having pistons F F' arranged to operate therein. Disposed beside said cylinders $E^2$ $E^3$ and submerged by the operating fluid are force-pumps $F^2$ $F^3$, which are connected to said cylinders $E^2$ $E^3$ by pipes $a$ $a$, having arranged therein the check-valves $b$ $b$, three-way valves $c$ $c$, provided with levers $c^2 c^2$, and outlet-ports $d d$, communicating with said valves $c$ $c$. $F^4$ $F^5$ denote pistons working within the cylinders of the force-pumps $F^2$ $F^3$, having check-valves $e$ $e$ arranged in the heads thereof.

Secured to the tops of the cylinders $E^2$ $E^3$ are arms G G, having bell-crank levers $G^2$ $G^2$ arranged at their upper ends, the ends of said bell-crank levers $G^2$ $G^2$ being connected with the ends of the valve-levers $c^2 c^2$ by connecting-rods $f f$, respectively, and arranged upon the said arms G G, adjacent to the upper ends of the cylinders $E^2$ $E^3$, are levers $g$ $g$, the ends of which are connected by connecting-rods $g^2$ $g^2$ to the bell-crank levers $G^2$ $G^2$, and $G^4$ $G^4$ denote trips secured to the rods of the pistons F' $F^2$, adapted to strike the ends of the levers $G^2$ $G^2$ and $g$ $g$ to operate the valves $c$ $c$.

Arranged within the fluid-receptacles E E' are bearings H H', in which are mounted shafts $H^2$ $H^3$, having fixed thereon pinions $H^4$ $H^5$, and eccentrics I I', surrounded by strap-sections $h$ $h$, the ends of which are pivotally connected to the ends of the piston-rods of the small cylinders $F^2$ $F^3$.

Above the fluid-receptacles E E' is supported in bearings J J a shaft J', having fixed thereon the pinions K K' and large gear-wheels $K^2$ $K^3$ in mesh with the pinions $H^4$ $H^5$ on the eccentric-shafts $H^2$ $H^3$, and in front of said shaft J' are supported in bearings L L the shafts L' $L^2$, having fixed thereon the large gear-wheels $L^3$ $L^4$, meshing with the pinions K K' on the shaft J', and M M' denote ratchet-wheels fixed upon said shafts L' $L^2$, provided with operating-levers $M^2 M^3$, having spring-pawls $i$ $i$ pivoted thereto.

Arranged above the top of the vehicle-body A and supported in bearings O O' are right and left threaded screws P P', having fixed at their inner ends the hand-wheels $P^2$ $P^3$ and at their outer ends the cranks $P^4$ $P^5$, connected by a link $P^6$, and upon said screws P P' intermediate their respective bearings are traveling heads Q Q', having depending slotted sections in which work the ends of the operating-levers M² M³. Intermediate the mechanism just described is arranged the steering mechanism, which comprises a vertical shaft R, the lower end of which is connected to the truck of the steering-wheels, a gear-wheel R', fixed to the upper end of said shaft, a shaft R², arranged at right angles to the shaft R and supported in bearings R³ on the vehicle-body, upon which shaft is fixed a worm R⁴, in mesh with the gear-wheel R, and an operating-wheel R⁵, fixed upon the inner end of said shaft R².

S denotes the brake mechanism, comprising the shaft S', provided with an operating-wheel S² and a chain S³ or other suitable connection arranged between the lower end of the shaft and a collar S⁴, fixed on the rear axle C of the vehicle.

Within the central depressed portion of the vehicle-body is secured a standard T, upon the top of which is pivotally mounted the U-shaped lever T', the upturned ends of which are provided with slots $j\,j'$, through which extend the pins $k\,k'$, secured to the ends of the rods of pistons F F', the outer ends of said pins being guided on the inclined slots $l\,l'$, arranged in the inner side of the vehicle-body, while the inner opposing ends of said pins $k\,k'$ are guided in the corresponding inclined slotted plates $m\,m'$, supported upon the ends of the standards $n\,n'$.

The various trains of gearing whereby the reciprocating movement of the pistons F F' is converted into a rotary movement will be best understood by reference to the diagrammatic Fig. 9.

Within the vehicle-body, directly behind the standard T, the rear of which is recessed, is supported in suitable bearings a shaft 1ª, having fixed upon its outer ends the ratchet-wheels U U' and the lower ends of the operating-levers V V', said operating-levers having their upper ends slotted and pivotally connected with the inner ends of the pistons F F' and their lower ends provided with cheek-plates W, (see Figs. 5 and 6,) between which are located the ratchet-wheels U U', and above said ratchet-wheels are arranged spring-pawls W'.

2ª and 3ª denote large gear-wheels which are fixed upon the shaft 1ª, adjacent to the ratchet-wheels U U'. To the rear of and slightly above the shaft 1ª is supported a shaft 1ᵇ, having fixed upon its farther end a pinion 2ᵇ in mesh with the gear-wheel 2ª, and fixed upon its forward end is a large gear-wheel 2ᶜ, and above the shaft 1ª is located a shaft 1ᶜ, having fixed near its forward end a pinion 2ᵈ and adjacent to its farther end tight and loose pulleys 2ᵉ, which are connected by a belt 2ᶠ to the pulleys D D' on the rear axle C of the vehicle, the gearing just described constituting a train capable of imparting a given speed to the vehicle.

To the rear of the shaft 1ᶜ and above the shaft 1ᵇ is supported a short shaft 1ᵈ, having fixed at its forward end a pinion 3ᵇ in mesh with the large gear-wheel 3ª, and near the farther or rear end of said short shaft 1ᵈ are fixed the tight and loose pulleys 3ᶜ, which are connected by a belt 3ᵈ to the pulleys D² D³ on the rear axle C, said gears, in combination with the first train, being adapted to propel the vehicle at a second rate of speed.

Upon the short shaft 1ᵈ, intermediate the pinion 3ᵇ and the pulleys 3ᶜ, is fixed a large gear-wheel 4ª, and to the rear of and above the shaft 1ᵇ is supported a shaft 1ᵉ, having fixed thereon near its forward end a pinion 4ᵇ in mesh with the large gear-wheel 4ª on the short shaft 1ᵈ, and also fixed upon said shaft 1ᵉ in front of the pinion 4ᵇ are the tight and loose pulleys 4ᶜ, which are connected by a belt 4ᵈ with the pulleys D⁴ D⁵ on the axle C, and this train of gearing, in combination with the two trains above described, being capable of imparting a third rate of speed to the vehicle.

To the rear of the shaft 1ᵉ is supported a short shaft 1ᶠ, and to the rear of said shaft 1ᶠ is supported a shaft 1ᵍ, having fixed at its opposite ends the balance-wheels 5ᶜ and near its farther end a pinion 5ᵈ, which meshes with a large gear-wheel 5ᵉ on the short shaft 1ᶠ.

5ᵇ denotes a pinion fixed upon the farther or rear end of the short shaft 1ᶠ, which pinion meshes with a large gear-wheel 5ª, fixed upon the rear end of the shaft 1ᵉ.

X X' X² denote belt-shippers for the belts 2ᶠ 3ᵈ 4ᵈ.

The operation of the apparatus is as follows: To set the vehicle in motion, the belt 2ᶠ must be first shifted upon the fixed pulleys 2ᵉ D' by means of the belt-shipper X. Hereupon it simply becomes necessary for the operator to rotate one of the hand-wheels P² P³. We will assume that the operator is rotating the hand-wheel P² on the screw P. This will cause the head Q and lever M² to advance in the direction of the arrow, Fig. 3, and rotate the shaft L' by means of the ratchet-wheel M and pawl $i$ and impart a rotary movement to the shaft L', to the large gear-wheel L³, pinion K, large gear-wheel K², and pinion H⁴ and operate the eccentric I and cause the piston F⁴ to force the fluid from the receptacle E into the large cylinder E² by way of the pipe $a$ and valve $c$ and force the rod of the piston F out of the cylinder E², and thereby partially rotate the operating-lever U and the shaft 1ª. As soon as the trip G⁴ on the rod of the piston F strikes the end of the bell-crank lever G² it will depress its other end and cause the connecting-rod $f$ to shift the valve $c$ to the position indicated at Fig. 7 and as the piston F falls cause the fluid in the cylinder E² to be discharged through the valve $c$ and the port $d$ into the receptacle E. Hereupon it simply becomes necessary to rotate the hand-wheel P² in the reverse direction to maintain the apparatus in operation by means of the cylinder E³ and piston F'. It will of course be understood that while the piston F is being forced out of its cylinder E² the piston F' will be forced into its cylinder E³ by means of the U-shaped lever T' on the standard T and the liquid therein discharged into the receptacle E, the operating-lever M³ being returned to its initial position without causing the eccentric I' and piston F⁵ to operate, and vice versa. The alternating movement of the operating-levers V V' will cause the driving-shaft 1ª (see Fig. 9) to be continually rotated and set the balance-wheels 5ᵉ in motion through the large gear-wheel 2ª on the shaft 1ª, pinion 2ᵇ on shaft 1ᵇ, large gear-wheel 5ª on shaft 1ᵉ, pinion 5ᵇ and gear-wheel 5ᶜ on shaft 1ᶠ, and pinion 5ᵈ on the balance-wheel shaft 1ᵍ. At the same time movement will be imparted to the rear axle C of the vehicle from the driving-shaft 1ª through the gear-wheel 2ª, fixed on said shaft 1ª, pinion 2ᵇ, and gear-wheel 2ᶜ on shaft 1ᵇ, and the pinion 2ᵈ and pulleys 2ᵉ on shaft 1ᶜ, said pulleys 2ᵉ being connected by a belt 2ᶠ with the pulleys D D' on the rear axle C of the vehicle. Should the second rate of speed be desired, it simply becomes necessary to shift the belt d³ upon the fixed pulleys 3ᶜ and D³ and by means of the belt-shipper X' shift the belt 2ᶠ upon the loose pulleys. Hereupon the movement will be imparted to the rear axle from the shaft 1ª through the gear-wheel 3ª on said shaft, pinion 3ᵇ on shaft 1ᵈ, and pulley 3ᶜ, which is connected by a belt 3ᵈ with the pulley D³ on the rear axle C, and when the third rate of speed is desired it merely becomes further necessary to shift the belt 3ᵈ upon the loose pulleys 3ᶜ D² by means of the belt-shipper X' and shift the belt d⁴ upon the fixed pulleys 4ᶜ and D⁵ by means of the belt-shipper X², whereupon the rotary movement will be imparted to the rear axle C by means of the train of gearing 3ª 3ᵈ, in combination with the gear-wheel 4ª on shaft 1ᵈ, pinion 4ᵇ, and pulley 4ᶜ on shaft 1ᵉ, said pulley 4ᶜ being connected by a belt 4ᵈ with the fixed pulley D on the rear axle C. To stop the vehicle, the belt of the train of gearing in operation must first be shifted by means of its respective belt-shipper and the brake then applied by turning the wheel S².

It will be observed that in the accompanying drawings I have merely shown the underbody portion of the vehicle without the superstructure, which may be of any desirable construction and adapted for either business or pleasure vehicles.

Without limiting myself to the various details of construction, which may be varied within the scope of the invention, what I claim, and desire to secure by Letters Patent, is—

1. In a vehicle of the character specified, a plurality of fluid-receptacles, cylinders adapted to receive a fluid disposed partly within and partly without said receptacles, pistons arranged to operate within said cylinders having rods projecting beyond the ends thereof, provided with tripping devices, guides for said piston-rods, a lever pivotally mounted having its ends upturned and slotted and connected with the ends of the piston-rods aforesaid to force the same back into their cylinders, force-pumps disposed within the fluid-receptacles, pipes connecting said force-pumps and cylinders provided with outlet-ports and valves; arms secured to the cylinders each having two levers pivotally secured thereon connected together, and connecting-rods connecting the ends of one lever of each set with the levers of the valves intermediate the force-pumps and cylinders, gearing arranged intermediate the shaft of the rear driving-wheels and said cylinders, shafts provided with eccentrics and ratchet-levers combined with screws having their inner ends provided with hand-wheels and their outer ends with cranks, a connecting-rod connecting said cranks, and traveling heads arranged upon said screw connected with the ends of the ratchet-levers on the eccentric-shafts, substantially as specified.

2. In a vehicle of the character specified, the combination with a plurality of fluid-cylinders, provided with force-pumps, means for operating the same, and a pivoted lever having its ends upturned and pivotally connected with the ends of the piston-rods of the fluid-cylinders, of a main driving-shaft having gear-wheels and ratchet-wheels fixed thereon, operating-levers arranged upon said driving-shaft pivotally connected with the ends of the piston-rods of the fluid-cylinders and provided with pawls adapted to engage the ratchet-wheels whereby to rotate the driving-shaft, pulleys fixed upon the axle of the rear wheels of the vehicle, gearing and belts interposed between said pulleys and gear-wheels on the driving-shaft, and speed-changing mechanism whereby portions of the gearing may be shifted into operative position to propel the vehicle at different rates of speed, substantially as specified.

3. In a vehicle of the character specified, the combination with a plurality of fluid-cylinders provided with force-pumps, means for operating the same, and a pivoted lever having its ends upturned and pivotally connected with the ends of the piston-rods of the fluid-cylinders, of a main driving-shaft having gear-wheels and ratchet-wheels fixed thereon, operating-levers arranged upon said driving-shaft having their upper ends pivotally connected with the ends of the piston-rods of the fluid-cylinders, and the pivoted levers aforesaid, and their lower ends provided with spring-pawls adapted to engage the ratchet-wheels whereby to rotate the main driving-shaft, a series of fixed and loose pulleys arranged upon the rear shaft of the vehicle, a plurality of shafts arranged intermediate the main driving-shaft and the rear shaft, fixed and loose pulleys arranged upon said intermediate shafts, belts connecting the pulleys of said intermediate shafts with the pulleys on the rear shaft, gear-wheels fixed upon said intermediate shafts meshing with the gear-wheels on the main driving-shaft, and means for shifting the belts connecting the pulleys of the intermediate shafts with the pulleys on the rear shaft whereby to cause the same to rotate the rear shaft and the vehicle at different rates of speed, substantially as specified.

4. In a vehicle of the character specified, the receptacles E, E' carried by said vehicle, and having cylinders $E^2$, $E^3$ arranged therein provided with pistons F, F', force-pumps $F^4$, $F^5$ and valves c, c, means for alternately operating said force-pumps and valves, and the pivoted lever T' connected with the ends of the piston-rods F, F', combined with the driving-shaft $1^a$ having gear-wheels $2^a$, $3^a$ and ratchet-wheels U, U' fixed thereon, operating-levers V, V' having their upper ends connected with the ends of the pivoted lever T' and the ends of the piston-rods F, F', a shaft $1^g$ having balance-wheels $5^e$ fixed thereon and operated by the driving-shaft $1^a$ through the train of gearing $2^b$, $5^a$, $5^b$, $5^c$, $5^d$; the rear shaft C having fixed thereon the sets of pulleys D, D', $D^2$, $D^3$, $D^4$, $D^5$, the pulley D' being operated by the driving-shaft $1^a$ through the train of gearing $2^a$, $2^b$, $2^c$, $2^d$, fixed pulley $2^e$ and belt $2^f$; the pulley $D^3$ operated through the train $3^a$, $3^b$, fixed pulley $3^c$ and belt $3^d$, and pulley $D^5$ operated through the train $4^a$, $4^b$, fixed pulley $4^c$ and belt $4^d$, substantially as and for the purpose set forth.

Signed at the city of New York, in the county and State of New York, this 2d day of August, 1899.

OTTO WAECHTERSHAEUSER.

Witnesses:
 SAMUEL STURTZ,
 CORNELIUS HUTH.